United States Patent
Lim et al.

(10) Patent No.: US 9,071,332 B2
(45) Date of Patent: *Jun. 30, 2015

(54) BASE STATION AND CLOCK SYNCHRONIZATION METHOD THEREOF

(71) Applicant: Samsung Electronics Co., Ltd., Suwon-si, Gyeonggi-do (KR)

(72) Inventors: Jai Jin Lim, Seoul (KR); Woo Jae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,507

(22) Filed: Mar. 4, 2014

(65) Prior Publication Data

US 2014/0187144 A1  Jul. 3, 2014

Related U.S. Application Data

(63) Continuation of application No. 13/235,897, filed on Sep. 19, 2011, now Pat. No. 8,666,009.

(30) Foreign Application Priority Data

Sep. 20, 2010 (KR) .......................... 10-2010-0092472

(51) Int. Cl.
| | |
|---|---|
| *H04L 7/00* | (2006.01) |
| *H04B 7/26* | (2006.01) |
| *H04J 3/06* | (2006.01) |
| *H04B 7/185* | (2006.01) |

(52) U.S. Cl.
CPC ............ *H04B 7/2662* (2013.01); *H04J 3/0641* (2013.01); *H04J 3/0644* (2013.01); *H04B 7/1851* (2013.01)

(58) Field of Classification Search
CPC ...... H04B 7/2662; H04B 7/1851; H04B 7/24; H04B 7/26; H04J 3/0641; H04J 3/0644; H04J 3/0638; H04J 3/0647; H04J 3/065
USPC .................. 375/356, 357, 373, 354; 455/462; 368/10, 47
See application file for complete search history.

(56) References Cited

U.S. PATENT DOCUMENTS

| | | |
|---|---|---|
| 5,677,895 A | 10/1997 | Mankovitz |
| 5,805,530 A | 9/1998 | Youngberg |
| 5,898,929 A | 4/1999 | Haartsen |
| 6,542,754 B1 * | 4/2003 | Sayers et al. .................. 455/502 |
| 7,522,688 B2 | 4/2009 | Shemesh et al. |

(Continued)

*Primary Examiner* — Phuong Phu
(74) *Attorney, Agent, or Firm* — Jefferson IP Law, LLP

(57) ABSTRACT

An enhanced base station and clock synchronization method are provided. The method includes scanning to discover a satellite transmitting a satellite signal and a master base station providing clock synchronization signal, entering, when a satellite having a signal that fulfills predetermined conditions is found, a master mode for receiving the satellite signal to acquire clock synchronization and transmitting a clock synchronization signal to at least one slave base station, and entering, when no satellite having a signal that fulfills the predetermined conditions is found, a slave mode for receiving the clock synchronization signal from the master base station to acquire clock synchronization. The method allows the base station to switch between the master and slave modes dynamically according to variation of the communication environment, resulting in efficient clock synchronization.

20 Claims, 4 Drawing Sheets

(56) References Cited

U.S. PATENT DOCUMENTS

| | | |
|---|---|---|
| 8,212,601 B2 | 7/2012 | Davis |
| 8,279,896 B2 | 10/2012 | Etkin et al. |
| 8,666,009 B2 * | 3/2014 | Lim et al. .................. 375/356 |
| 2005/0259722 A1 | 11/2005 | Vanlonden et al. |
| 2009/0168808 A1 | 7/2009 | Cho et al. |
| 2012/0020191 A1 | 1/2012 | Shemesh |

* cited by examiner

FIG. 4

| 410 | 420 | 430 | 440 | 450 | 470 |
|---|---|---|---|---|---|
| Node ID | Node Mode | ClkState | NodeMap | NodeMode-Slave : Master IP Address<br>NodeMode-Master : # slaves, # sats, maxSnr | Last update Timestamp |

BASE STATION AND CLOCK SYNCHRONIZATION METHOD THEREOF

PRIORITY

This application is a continuation application of prior application Ser. No. 13/235,897, filed on Sep. 19, 2011, which claimed the benefit under 35 U.S.C. §119(a) of a Korean patent application filed on Sep. 20, 2010 in the Korean Intellectual Property Office and assigned Serial No. 10-2010-0092472, the entire disclosure of which is hereby incorporated by reference.

BACKGROUND OF THE INVENTION

1. Field of the Invention

The present invention relates to a base station selection method. More particularly, the present invention relates to a dynamic master base station selection method for clock synchronization among base stations in an in-building base station environment.

2. Description of the Related Art

It is necessary to establish synchronization among base stations in a mobile communication system, and typically an outdoor base station acquires synchronization with Global Positioning System (GPS) signals received from satellites. However, in an in-building environment, GPS signal reception is deteriorated which is an obstacle for installing an in-building base station.

In one proposed solution to address this problem, the conventional Institute of Electrical and Electronic Engineers (IEEE) 1588 standard determines a master base station and slave base stations among a plurality of in-building base stations and establishes synchronization of the slave base stations to the master base station. This method has a drawback in that, when the master base station fails to receive a GPS signal, all the slave base stations also fail to acquire synchronization.

Also, even when there is a base station that can provide a precise clock signal as compared to the current master base station, the slave base stations have no way to recognize such a situation and to replace the current base station with another one. Furthermore, the pre-configured slave base station cannot be re-configured as the master base station even though it can perceive the GPS signal stably and operate as a master base station.

A brief description is made of the IEEE 1588 standard.

The IEEE 1588 standard is a standard protocol defined for synchronization of clocks of distributed devices in a measurement and control system. The IEEE 1588 standard defines the protocol which categorizes devices into master and slave devices such that the clock of each slave device is synchronized with the clock of the master device. In an in-building environment, the synchronization can be acquired among the base stations by designating a base station capable of receiving a GPS signal as the master base station and transferring the GPS signal from the master base station to the slave base stations using the IEEE 1588 protocol.

A description is made of the operations of the master and slave base stations hereinafter. In the following, the description is directed towards the operations in view of the clock, but not base station management or the system in general. After being booted up, the master base station establishes an Assisted-GPS (A-GPS) connection to perform a GPS scan. In the GPS scan process, the master base station discovers the satellite to receive GPS information and thus, if an appropriate satellite is found, enters a locking state. If the signal meets a predetermined condition, the base station, as the master station, can transfer the clock information to the slave base stations.

Since it cannot operate as the master base station, the slave base station performs master (MST) scan right after initial boot-up without performing a GPS scanning process for discovering a satellite signal. The MST scan is a process to discover the base station as the IEEE 1588 master in the network, and the slave device performs clock synchronization with the master information acquired in the MST scan process. In case the slave has the record of the master information, the MST scan process can be omitted. After selecting the master base station, the slave base station exchanges clock information with the master base station to acquire clock synchronization.

As aforementioned, the IEEE 1588 protocol for conventional base station synchronization differentiates between the master and slave base stations such that the master base station acquires a clock signal from a satellite and transfers the clock signal to the slave base station using the IEEE 1588 protocol. In such an environment however, the roles of the base stations as the master and slave are determined at the installation stage. That is, the base station acting as the master pre-configures the information on the slave base stations to be managed, and each of the slave base stations pre-configures the information on the master base station. After installation, the slave base stations discover the master base station to establish network synchronization with the clock information provided by the found master base station. Although each slave base station can discover the master base station dynamically in the MST scan process, it is impossible to change the master base station, which has been already selected, with another base station and, as a consequence, this is equal to pre-configuration.

If the master base station fails to receive a signal from a GPS satellite, the master base station cannot provide the slave base stations with clock information which causes synchronization failure of the entire network, resulting in a service breakdown. Also, if there is a network disconnection problem even though the master base station has received the satellite signal successfully, the slave base stations cannot receive the clock information. Since each slave base station cannot change the current master base station for another base station, if the clock signal is not received from the current master base station, the slave base station cannot maintain the clock synchronization with the master base station.

SUMMARY OF THE INVENTION

Aspects of the present invention are to address at least the above-mentioned problems and/or disadvantages and to provide at least the advantages described below. Accordingly, an aspect of the present invention is to provide a base station that is capable of switching between master and slave modes dynamically according to the operation environment and clock synchronization method thereof.

In accordance with an aspect of the present invention, a clock synchronization method of a base station is provided. The method includes scanning to discover a satellite transmitting a satellite signal and a master base station providing a clock synchronization signal, entering, when a satellite having a signal that fulfills predetermined conditions is found, a master mode for receiving the satellite signal to acquire clock synchronization and transmitting a clock synchronization signal to at least one slave base station, and entering, when no satellite having a signal that fulfills the predetermined conditions is found, a slave mode for receiving the clock synchronization signal from the master base station to acquire clock synchronization.

In accordance with another aspect of the present invention, a base station is provided. The base station includes a Global Positioning System (GPS) module for scanning to detect a satellite transmitting a satellite signal, a communication module for scanning to detect a master base station providing a clock synchronization signal, for receiving the clock synchronization signal form the master base station, and for providing slave base stations with the clock synchronization signal, and a Dynamic Multi-master Selection (DMS) module for acquiring, when a satellite having a signal that fulfills predetermined conditions is found by the GPS module, clock synchronization of the base station with the clock synchronization signal received by means of the GPS module, for providing the slave base station with the clock synchronization signal by means of the communication module, and for acquiring, when no satellite having a signal that fulfills the predetermined conditions is found by the GPS module but the master base station fulfilling the predetermined conditions is found by the communication module, clock synchronization of the base station with the clock synchronization signal received from the found master base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 is a diagram illustrating a format of a packet for use in a master scan according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
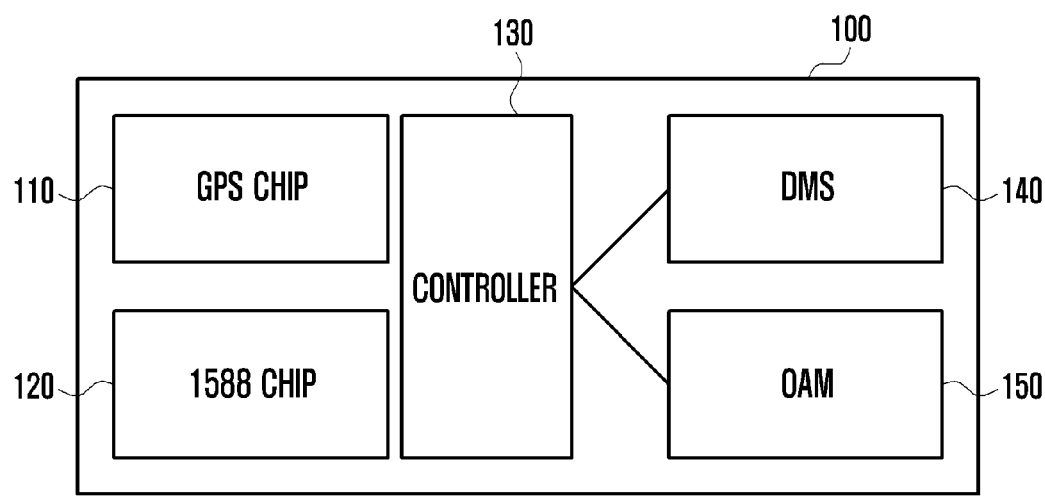
FIG. 1 is a block diagram illustrating an in-building base station according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, certain elements may be exaggerated or omitted or schematically depicted for clarity of the invention, and the actual sizes of the elements are not reflected. The same reference numbers are used throughout the drawings to refer to the same or like parts.

The advantages and features of the invention will be apparent from the following description of exemplary embodiments, considered along with the accompanying drawings. However, those skilled in the computer arts will appreciate that the invention is not limited to the described embodiments, but can be implemented in various embodiments including stand-alone e-mail clients. Alternative exemplary embodiments will become apparent to those skilled in the art to which the present invention pertains without departing from its spirit and scope. Accordingly, the scope of the present invention is defined by the appended claims and their equivalents rather than the foregoing description.

A description is made of an exemplary base station and clock synchronization method thereof hereinafter with reference to the accompanying drawings.

FIG. 1 is a block diagram illustrating an in-building base station according to an exemplary embodiment of the present invention.

Referring to FIG. 1, the base station 100 includes a Global Positioning System (GPS) chip 110, a 1588 chip 120, a controller 130, a Dynamic Multi-master Selection (DMS) module 140, and an Operation, Administration, and Maintenance (OAM) module 150. Here, the GPS chip 110 is an exemplary type of GPS module for receiving a GPS signal. In the following, the description is directed to exemplary embodiments of the base station equipped with a GPS chip.

The GPS chip 110 is a component for receiving a GPS signal from satellites. The GPS chip 110 can receive the satellite signal including a clock synchronization signal. Unless otherwise stated, the term "satellite signal" and "GPS signal" mean the signals containing the clock synchronization signal transmitted by a satellite.

The 1588 chip 120 is responsible for communication based on the Institute of Electrical and Electronics Engineers (IEEE) 1588 protocol. Although the description is directed to the case using the IEEE 1588 protocol, a communication module operating with another protocol defined for clock synchronization can be used in spite of the 1588 chip 120. The 1588 chip 120 should be understood as an exemplary communication module for clock synchronization with other base stations.

The controller 130 controls overall operations of the base station 100.

The DMS module 140 is responsible for selecting a master base station or determining whether to operate as the master or slave base station according to the proposed method of the present invention.

The OAM module 150 is a network entity responsible for error display, performance information display, data diagnosis functionalities, and the like.

The GPS chip 110, 1588 chip 120, and DMS module 140 can exchange signals via a Universal Asynchronous Receiver/Transmitter.

Figure 2:
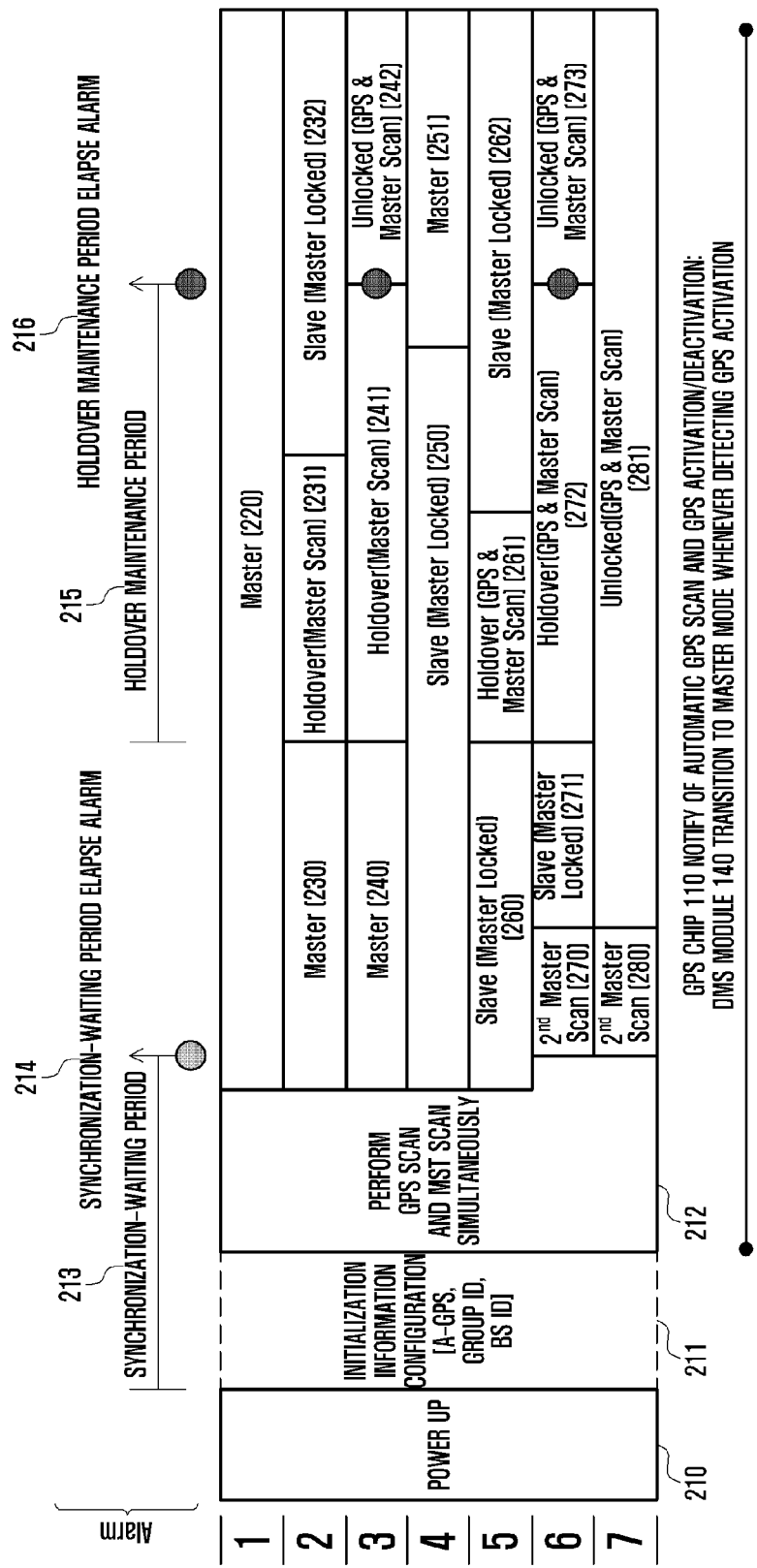
FIG. 2 is a diagram illustrating state transitions of a base station according to an exemplary embodiment of the present invention.
Figure 3:
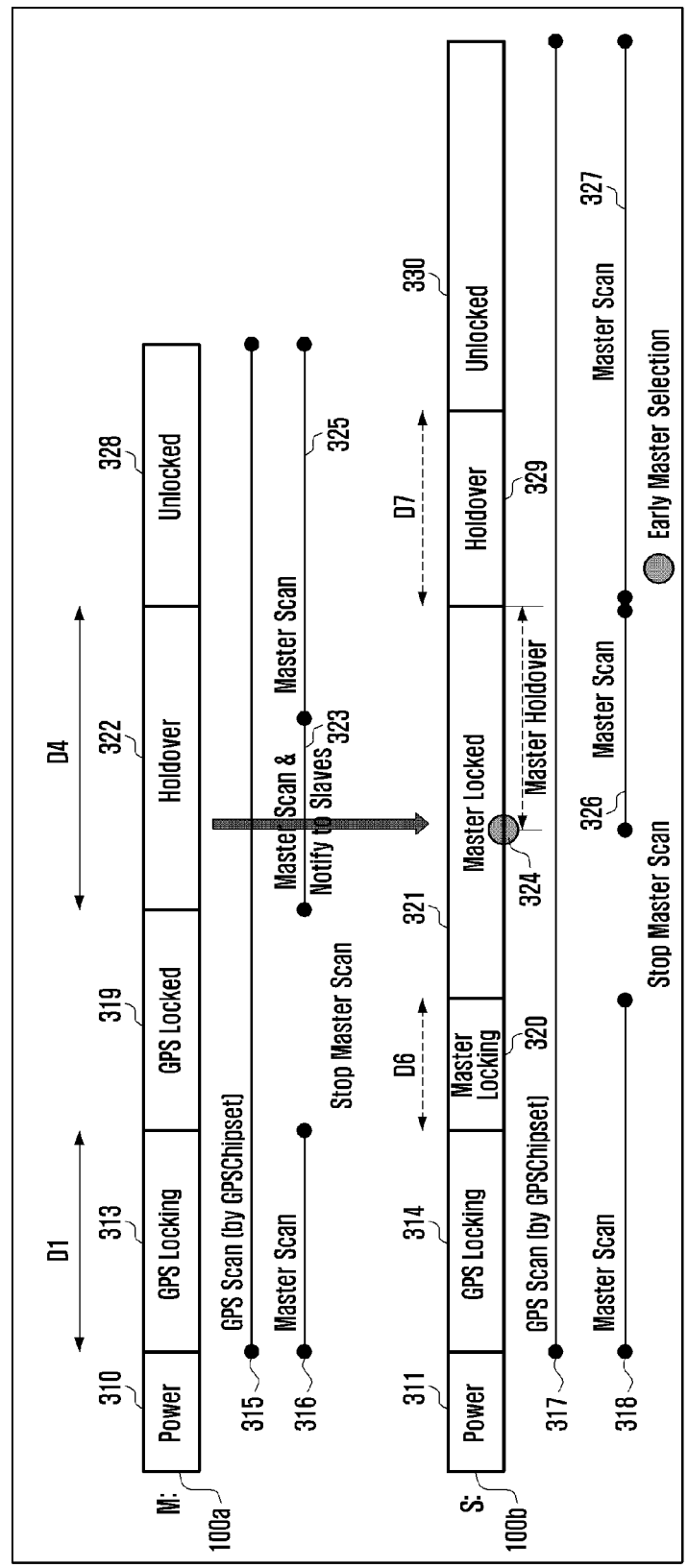
FIG. 3 is a diagram illustrating operations of base stations according to an exemplary embodiment of the present invention.

More detailed descriptions are made of the configurations and operations of the individual components with reference to FIGS. 2 to 4.

A description is made below of the master base station and slave base station.

A certain base station can switch between master and slave modes so as to be one of the master and slave base stations dynamically. The master base station receives the clock synchronization signal from a satellite and acquires its clock synchronization based on the clock synchronization signal. If a base station acquires clock synchronization using the clock synchronization signal received from the satellite, this means that the base station operates in master mode. The base station operating in master mode can provide slave base stations with the clock synchronization signal. The slave base station can acquire its clock synchronization based on the clock synchronization signal received from the master base station. If a base station acquires clock synchronization using the clock synchronization signal received from the master base station, this means that the base station operates in slave mode.

The conditions to be the master or slave base station according to an exemplary embodiment of the present invention are as follows and can be modified in other exemplary embodiments.

(1) Conditions to Become Master and Slave Base Stations

A base station can be the master base station by fulfilling the following conditions:

The GPS chip should be able to receive signals from at least four satellites, and the signal strength of each satellite should be able to be equal to or greater than −144 dbm without Assisted-GPS (A-GPS)/location data or greater than −160 dbm with A-GPS support. If this condition is fulfilled, the base station enters the locking state.

The GPS locking state should be maintained over 1 minute, and the error of the location measured based on the GPS signal should be within less than 50 m. If this condition is fulfilled, the base station can transition from the locking state to the fixed state. The base station can operate as the master base station only in fixed state and, if the number of satellites of which signals are received by the master base station operating in fixed state is equal to or greater than one, becomes the master base station.

The clock accuracy should be maintained within the range of 0.02 ppm+/−3 μs for normal operation and, if failing this clock accuracy, the base station can no longer be the master base station and shuts down the operation of a Radio Frequency (RF) unit. That is, the transfer of the clock synchronization signal stops, and the base station stops operation. Nevertheless, the base station can continue the master scan and GPS scan operations.

The conditions to become the master base station are just examples and can be changed according to the system characteristics. The conditions to become the master base station can be set in advance.

A base station can be the slave base station by fulfilling the following conditions:

The accuracy of the clock received from the master base station should be within the range of 0.02 ppm+/−3 μs and, if failing this clock accuracy, the base station shuts down the operation. That is, the base station stops operation. Nevertheless, the base station can continue the master scan and GPS scan operations.

The conditions to become the slave base station are just examples and can be changed according to the system characteristics. The conditions to become the slave base station can be set in advance.

(2) Initial Configuration Information of Base Station

Each base station should configure the information on the group to which it belongs initially (i.e., Group ID). The base stations sharing the group ID maintain clock synchronization among each other. A set of the base stations having the same group ID is referred to as group. Each base station operates as a master or slave base station within its own group. The group information can be configured dynamically and, in the following description, it is assumed that each base station has already had the information on the group to which it belongs. Also, each base station has the identity information of other base stations belonging to the same group. The information can be stored in the base station itself or downloaded from a management system in the boot-up process of the base station. The identity information of the base station belonging to the same group can include at least one of Media Access Control (MAC) address and Internet Protocol (IP) address of each base station.

At the installation stage, the base station is configured with the A-GPS server information. Like the system using the GPS signal acquiring more accurate clock information under the assistance of the A-GPS server, the system according to an exemplary embodiment of the present invention is configured with such A-GPS information to be assisted by the A-GPS server. Finally, the slave base station should configure a User Datagram Protocol (UDP) server port necessary in the scan process for acquiring the information on the master base station. The scan process can be performed with the port 5218 of UDP as the protocol operating on the UDP/IP.

The group information, group member base station information, A-GPS server information, and UDP port information should be maintained even when the base station is rebooted.

(3) Operations of Master/Slave Base Station

FIG. 2 is a diagram illustrating state transitions of a base station according to an exemplary embodiment of the present invention.

Referring to FIG. 2, the numbers (1 to 7) arranged vertically at the left end of the drawing indicate exemplary operation cases of a base station. A description is made of the processes (denoted by reference numbers 210, 211, 212, and 213 executed identically by all the base stations 1 to 7.

In case of being configured to operate in auto-mode, the base station 100 powers up at step 210 during an initial booting, configures initialization information at step 211, and performs GPS scan and master (MST) scan simultaneously at step 212. In auto-mode, the base station scans to determine whether to receive the satellite signal (including clock synchronization signal) which fulfils the conditions to become the master base station. As aforementioned, if the satellite signal (i.e., GPS signal) is received at a strength equal to or greater than a predetermined level, the base station enters the GPS locking state and, if the signal strength is maintained over a predetermined duration and if the error of the location information measured based on the GPS signal is within a predetermined range, transitions to the fixed state. In the fixed state, the base station can work as the master base station. The GPS scan is performed by means of the GPS chip 110. Through the GPS scan, the base station discovers the satellite from which the satellite signal including the clock synchronization signal is received and determines whether the satellite signal fulfils predetermined conditions.

The MST scan is performed to discover the master base station within the group to which the base station belongs. The MST scan is performed by means of the 1588 chip 120. The master base station transmits the clock synchronization signal, and the clock synchronization signal should fulfill the predetermined conditions (e.g., the clock accuracy should be within the range of 0.02 ppm+/−3 μs). That is, the MST scan is the process for discovering the master base station transmitting the clock synchronization signal fulfilling the predetermined conditions.

In case that the clock synchronization has not been completed after the power-up at step 210 and the synchronization-waiting time (ClockInServiceWait) 213 has elapsed, the DMS module 140 generates a synchronization-waiting time expiry alarm (No-CLK alarm) to the OAM module 150 as denoted by reference number 214. The No-CLK alarm is generated to notify of the synchronization failure in the synchronization-waiting time. The synchronization-waiting time (ClockInServiceWait) value can be determined as follows:

ClockInServiceWait=fixed value equal to or greater than D1+MAX{D2, D5+D6} (default value is 10 minutes)

where MAX {A, B} denotes a maximum value of A and B.

Here, the individual parameters have the respective meanings as follows:

D1: average time of NE reset (default value is 3 minutes)

D2: average time taken from A-GPS setup to active/fixed mode (default value is 7 minutes)

D5: average time taken to transition to MST scan

D6: average time taken from master IP setup to master activation (MST Active) (default value is 2 minutes)

Descriptions are made of the respective states. The sequence number of each case denotes one of the numbers arranged at the left end of the diagram of FIG. 2.

Case 1 is the case where the base station 100 receives the GPS signal through a GPS scan by the synchronization-waiting time 213. In this case, the DMS module 140 controls such that the base station 100 operates in master mode at step 220 (i.e., work as the master base station). As aforementioned, if the satellite from which the GPS signal (satellite signal) fulfilling the predetermined conditions is found, the base station 100 starts operating in master mode to receive the clock synchronization signal from the found satellite, acquires synchronization with the clock synchronization, and transfers the clock synchronization signal to the slave base stations. The base station operating in master mode stops master scan operation.

Case 2 is the case where the base station 100 receives the GPS signal through the GPS scan by the synchronization-waiting time 213 and starts operating in master mode at step 230. If the GPS signal is not received at step 231, the DMS module 140 controls such that the base station operates in holdover state. The holdover state is the state in which the base station does not receive any external clock signal (e.g., GPS signal) so as to generate the clock internally. In the holdover state, the GPS scan and MST scan are performed. Afterward, if the base station 100 fails to receive a GPS signal again by expiry of the holdover maintenance time period 215 but discovers the master base station as the result of the MST scan, the DMS module 140 controls such that the base station 100 operates in slave mode at step 232. Of course, if the GPS signal is discovered before the expiry of the holdover maintenance time period 215, the base station can operate in master mode.

In case 3, the base station 100 enters the holdover state due to the drop of the GPS signal at step 241 while operating in master mode with the receipt of the GPS signal at step 240 similar to case 2. Nevertheless, if the base station 100 does not receive the GPS signal by expiry of the holdover maintenance period 215, the DMS module 140 controls such that the base station 100 operates in master mode no longer and enters the unlocked state at step 242. In the holdover state, the base station 100 generates the clock by itself such that the clock may differ from the original clock. Accordingly, in case that the holdover state is maintained over predetermined time duration, it is difficult to guarantee the accuracy of the clock. In the unlocked state, the base station 100 performs the GPS scan and MST scan. If the GPS signal is detected through the GPS scan in the unlocked state, the base station operates as the master base station. And, if the master base station is discovered through the MST scan, the base station operates as the slave base station. In case that both the conditions are fulfilled, it is preferred that the base station operates as the master base station. If both the GPS scan and MST scan fail by the expiry of the holdover maintenance period 215 in holdover state (i.e., required to transition to the unlocked state), the DMS module 140 generates a holdover-exceed alarm 216 to the OAM module 150. As a consequence, the OAM module 150 can stop operation of the RF module in unlocked state.

Case 4 is the case where the base station 100 does not detect any GPS signal as the result of the GPS scan after initialization and selects the master base station in the MST scan process. As a consequence, the base station 100 operates in slave mode at step 250. If a satellite transmitting the satellite signal which fulfils the predetermined conditions is discovered while operating in the slave mode at step 251, the base station receives the satellite signal including the clock synchronization signal from the satellite, acquires clock synchronization of its own, and enters the master mode so as to transmit the clock synchronization signal to the slave base stations.

Case 5 is the case where the base station discovers the master base station as the result of the GPS scan and the MST scan after initialization and thus operates in slave mode at step 260. Afterward, if the clock signal is no longer received from the found master base station, the base station 100 enters the holdover state so as to perform the GPS scan and the MST scan at step 261. In case that the MST scan is performed successfully by the expiry of the holdover maintenance period 215, the base station 100 operates in slave mode at step 262.

In case 6, the base station 100 fails to receive any GPS signal by the expiry of the synchronization-waiting period 213 as the result of the GPS scan and the MST scan after initialization and also fails acquisition of the information on the master base station. In this case, the base station performs the MST scan one more time at step 270. The base station 100 finding the master base station operates in slave mode at step 271. The base station 100 which has not received the clock signal from the master base station enters the holdover state at step 272. Afterward, the base station 100 performs the GPS scan and the MST scan for the minimum holdover maintenance period 215. If failing detection of the GPS signal and acquisition of master information, the base station 100 stops operation of the RF module and repeats the GPS and the MST scans in an unlocked state at step 273.

In case 7, the base station performs the GPS and the MST scans after initialization but fails to detect the GPS signal and acquire master information. If it fails to discover the master base station in spite of the second MST scan at step 280, the base station 100 stops operation of the RF module at step 281 and repeats the GPS and the MST scans.

As shown in FIG. 2, the base station 100 repeats the GPS scan regardless of its state after initialization. This is for the base station 100 to attempt to receive the GPS signal through the GPS scan process and, when the GPS signal detected in the GPS scan process fulfils the predetermined conditions, enter the master mode at anytime. The base station operating in the master mode can perform the GPS scan to determine whether to maintain the master mode. In case that the base station operates in the master mode, the GPS scan can be skipped.

When GPS activation or GPS deactivation is detected, the GPS chip 110 notifies the DMS module 140 of the detection result. The DMS module 140 determines the operation mode of the base station based on the GPS activation or deactivation notification from the GPS chip 110 and the GPS scan information.

FIG. 3 is a diagram illustrating operations of base stations according to an exemplary embodiment of the present invention.

Referring to FIG. 3, the first and second base stations 100a and 100b have the same configuration as the base station 100 described above, and the first base station 100a operates as the master base station while the second base station 100b operates as a slave base station.

The first base station 100a powers up at step 310. Also, the second base station 100b powers up at step 311. Afterward, the first base station 100a performs the GPS scan at step 315 and the MST scan so as to enter the GPS locking state which is maintained for D1 at step 313. The second base station 100b performs the GPS scan at step 317 and the MST scan at step 318 but fails both the GPS and the MST scans by the expiry of the respective scanning periods. The first base station 100a which has succeeded the GPS scan 315 enters the master mode (GPS locked) at step 319 and stops the MST scan 316. The second base station 100b performs the MST scan 318 to discover the first base station 100a operating as the master base station. Afterward, the second base station 100b performs master locking for the period D6 at step 320. The second base station 100b which has succeeded the MST scan stops the MST scan and enters the slave mode (master locked) at step 321.

Meanwhile, the first base station 100a fails to receive the GPS signal and thus operates in the holdover state for the period D4 at step 322. Once it enters the holdover state, the first base station 100a performs the MST scan at step 323 while continuing the GPS scan at step 315 and notifies the second base station 100b of the holdover state entry and the MST and the GPS scan results (here, both scans have failed). If another master base station is found in the MST scan process, the master base station 100a can transfer the ID of the found master base station to the slave base station 100b such that the slave base station 100b can change the old master base station (i.e., the first base station 100a) for the newly found master base station. Afterward, the first base station 100a continues the MST scan at step 324.

The second base station 100b is notified of the holdover state entry of the first base station 100a as its master base station restarts the MST scan at step 326 to perform the early master selection process.

The first base station 100a which has failed both the GPS scan at step 315 and the MST scan at step 325 in the period D4 continues the GPS scan of step 315 and the MST scan of step 325 in unlocked state at step 328. If the first base station 100a enters the unlocked state, the second base station 100b performs the GPS scan of step 317 and the MST scan of step 326 in the holdover state during the period D7 at step 329. The second base station 100b which has failed both the GPS scan of step 317 and the MST scan of step 326 in the period D7 continues the GPS scan of step 317 and the MST scan of step 326 in the unlocked state at step 330.

The operations of the base stations that are depicted in FIGS. 2 and 3 can be described in an event-driven manner as follows:

1) In case that a "GPS activation" notification is received from the GPS chip 110, the DMS module 140 controls such that the base station enters the GPS locked state (i.e., the master mode) at step 319. At this time, the synchronization-waiting time alarm 214 is deactivated. In case that an "MST activation" notification is received from the 1588 chip 120, the DMS module 140 enters the MST locked state (i.e., the slave mode) at step 321. At this time, the synchronization-waiting time alarm 214 is deactivated. The GPS activation and MST activation are notified when the chips 110 and 120 have acquired the clock information having the level available for service. The process for acquiring the clock information at the level available for service is called GPS locking in case of information acquisition via GPS at step 313 and master locking in case of information acquisition via the master base station at step 320.

2) In case that a "GPS deactivation" notification is received from the GPS chip 110 in master mode, the DMS module 140 enters the holdover state at step 322. In case that a "MST deactivation" notification is received from the 1588 chip 120 in slave mode, the DMS module 140 enters the holdover state at step 329.

3) In case that it receives the GPS deactivation notification in master mode so as to enter the holdover state at step 322, the DMS module 140 performs master scans at steps 323 and 325 for the member nodes along with the GPS scan at step 315 and notifies the slave base stations of the holdover state entry of its own (master holdover advertisement) at step 323. Once the GPS and master scans have completed, the master base station notifies its slaves of the scan results at step 323.

4) In case that it receives the MST deactivation notification in slave mode and enters the holdover state at step 329, the DMS module 140 performs the master scan and master selection process at step 327.

5) In case that it is notified, in slave mode, of the holdover state entry of its master base station, the DMS module 140 performs the master scan and master selection process. That is, the DMS module 140 executes the early master selection function at step 326. If there is information indicating another master in the notification message received from the current master base station, the DMS module 140 can select the new master. If there is not information related to another master, the slave base station performs the master scan and selects a new master.

6) In case that the base station 100 transitions from the GPS locked or the MST locked state to the holdover state, the base station performs the master scan and master selection regardless of the operation mode.

7) In case that the holdover maintenance time period has elapsed in holdover state, the DMS module 140 generates the holdover maintenance time elapse alarm (Holdover-exceed) to the OAM module 150, and the base station 100 enters the unlocked state.

8) In case that the base station 100 is in unlocked state and the operator does not stop operation, the base station performs the master scan and master selection regardless of the operation mode of the node.

(4) Operations Related to Master Scan and Master Selection

Each base station acquires the information on the master of the group via master scan message exchange based on unicast UDP/IP. The slave base station selects the master using the acquired master information and sets the 1588 chip 120 with the IP address of the master so as to enter the slave mode.

In order to select a master, the master base station and the slave base station manage the information as follows.

The master base station can manage the information such as current state (e.g., UNLOCKED, GPSLOCKED, and HOLDOVER), GPS information (number of satellites and satellite signal (snr)), information on its slave base stations (e.g., number of slave base stations and IP addresses (or other identifiers) of the slave base stations).

The master and slave base stations can manage the master management status information (M-MAP). The M-MAP is the 48-bit MAP record of the operations mode at an interval of 30 minutes for 24 hours, and in which 1 indicates GPS locked (master) state and 0 the other states (master holdover/unlocked and slave). The M-MAP has the initial value consisted of all 1's.

FIG. 4 is a diagram illustrating a format of a packet for use in a master scan according to an exemplary embodiment of the present invention.

Referring to FIG. 4, the packet format is of being transmitted by the base station as the target of the scan in response to the master scan request of a base station.

The NodeID 410 is the identifier of a target base station to be scanned. The NodeID 410 can be an IP address.

The NodeMode 420 indicates the state of the target base station. The NodeMode 420 is set to 1 to indicate the GPS locked (master) state or 0 to indicate other states (master holdover/unlock and slave).

The ClkState 430 is the field for indicating the current clock state of the scanning target base station (GPSLocked, MSTLocked, Holdover, and Unlocked).

The NodeMap 440 is the M-MAP of the scanning target base station.

The field 450 contains the IP address (or other identifier) of the master base station when the scanning-target base station is in slave mode. In case that the scanning target base station is in master mode, the field 450 can include the information such as number of slave base stations (#slaves), number of satellites (#sats), and satellite signal strength (maxSnr).

The Last Update Timestamp field 470 contains the timestamp indicating the time point when the information of the scanning target base station is most recently updated.

When performing the master scan and master selection to the members of the group, the base station collects information by transmitting the packet as shown in FIG. 4 and selects the master based on the collected information. If it is determined that there is no base station appropriate as master, the master scan is repeated to all members of the group.

(5) Master Selection Algorithm

Each of the slave base stations selects the master base station based on the information about the members of the group that is acquired through the master scan process. The master base station selections can be performed in various ways, and two exemplary methods are proposed in the present invention.

The slave base station can acquire the information on the master such as M-MAP, number of satellites (#sats), number of slave base stations receiving service currently (#slaves), and received signal strength (maxSnr) from the current satellite. In case that there are multiple master base station candidates, a method for narrowing down the number of master base station candidates can be used. Since a large number of master base station candidates increases the time for selecting a master and thus causes service initiation delay of the slave base station, it is necessary to reduce the number of master base station candidates to be compared with each other. For this purpose, the M-MAPs of the master base station candidates.

The M-MAP has the information on the master management status for the previous 24 hours from the current time point that is recoded at an interval of 30 minutes. Typically, the GPS satellite orbits the earth periodically such that the base station can locate the satellite periodically at a specific time point. Although the base station is located at an interval different from 24 hours, it is possible to manage the M-MAP according to the base station locating period. The base station determines the slot representing the current time point based on the M-MAP of the master base station candidates and selects the base station operating as the master base station candidate in the next slot. Since the M-MAP has the information on whether the master base station candidate operates as master or transitions to slave at each time point, the base station can determine the master base station based on this information. The base station can reduce the number of master base station candidates to be compared with each other using this information.

The slave base station can select its master using the following two algorithms based on the master information acquired through the master scan process or master candidate information acquired through M-MAP analysis based on the master information.

1) Sequential Decision

Select at least one master base station candidate having the smallest number of slave base stations among the master base station candidates.

When multiple master base station candidates are selected at previous step, select at least one master base station candidate having the satellites from which the GPS signals are received among the previously selected master base station candidates.

When multiple master base station candidates are selected at previous step, select at least one master base station candidate having the highest received signal strength (e.g., Signal to Noise Ratio (SNR)).

When multiple master base station candidates are selected at previous step, select one of the multiple master base station candidates as the master base station randomly.

2) Weighted Decision

In this method, the master base station candidates are assigned scores that are weighted according to the number of slaves (#Slaves), the number of satellites (#Sats), and received signal strength (maxSNR) such that the master base station candidate having the highest score is selected as the master base station. The score of the master base station candidate is determined by equation (1). In Equation (1), #Node denotes a number of base stations belonging to the group. #Slaves denotes a number of slave base station of the corresponding master base station candidate. Min {#Sats} and max {#Sats} denote the minimum and maximum values of the number of satellites from which each master base station candidate receives a signal. maxSNR denotes the received signal strength of the corresponding master base station candidate, and min{maxSNR} and max{maxSNR} denote minimum and maximum values of the received signal strength measured at each master base station candidate within the corresponding group.

$$\text{Score} = a \times (\#\text{Node} - \#\text{Slaves})/\#\text{Node} + b \times (\#\text{Sats} - \min\{\#\text{Sats}\})/(\max\{\#\text{Sats}\} - \min\{\#\text{Sats}\}) + c \times (\text{maxSNR} - \min\{\text{maxSNR}\})/(\max\{\text{maxSNR}\} - \min\{\text{maxSNR}\})$$

Equation (1)

In Equation (1), the first term $(a \times (\#\text{Node} - \#\text{Slaves})/\#\text{Node})$ becomes smaller in value as the number of slave base stations served by the master base station candidate decreases so as to select the master base station candidate having a small number of slave base stations. The second term (b×(#Sats−min{#Sats})/(max{#Sats}−min{#Sats})) becomes greater in value as the number of satellites from which the master base station candidate receives a GPS signal increases so as to select the master base station candidate having the largest number of satellites from which it receives the GPS signal. The third term (c×(maxSNR−min{maxSNR})/(max{maxSNR}−min{maxSNR}) becomes greater as the received signal strength of the satellite signal increases so as to select the master base station candidate receiving the satellite signal with the higher received signal strength. Each slave base station selects the master base station candidate having the smallest number of slave base stations, the largest number of satellites from which GPS signals is received, and the satellite of which GPS signal is received with the highest received signal strength. Here, the weight a, b, and c of each item can be determined according to the weight of the item. For example, the weights can be set as a=0.4, b=0.4, and c=0.3.

(6) Message Process for DMS Operation

In order for the exemplary algorithm to operate, there should be a message exchange among the base stations. The DMS module of a base station exchanges the UDP/IP-based SCAN-REQ/RSP messages with the DMS module of another base station. The SCAN-REQ/RSP messages are transmitted/received regardless of whether the base station operates in master or slave mode.

1) The master base station transmits the master information to all nodes by means of the SCAN-REQ message in the GPS deactivation state (master GPSLocked Advertisement).

2) If it enters the holdover state with the GPS deactivation, the master base station acquires the master information by querying the nodes that are not the slaves of its own and transmits the master information to its slave nodes along with its holdover state entry information (Master Holdover Advertisement).

3) All the base stations manage the transmitter's node mode {master, slave}, clock state {GPSLocked, MST-Locked, Holdover, Unlocked}, and M-MAP information in the SCAN-REQ/RSP exchange process. All the base stations manage the slave information {#Slaves, Slave IP list} for the transmitter in master mode and the master information {masterIPAddress} for the transmitter in slave mode in the SCAN-REQ/RSP exchange process.

The SCAN-REQ/RSP message is configured in the message format transmitted on the UDP/IP as follows:

1) SCAN-REQ message
version: DMS_MSGVERSION_1_0
msgType: DMS_MSGTYPE_SCANREQ
ackRequired: 0 or 1 (field indicating whether the replay is required)
sequenceId: monotonically increasing value
groupId: group ID
originTimestamp: message transmission time
myProfile.nodeId.ipAddress: IP address of base station
myProfile.nodeId.identifier: MAC address of base station
myProfile.nodeMode: operation mode of base station (master or slave)
myProfile.nodeMMap: M-MAP information of base station
myProfile.clkState: clock state of base station (GPS Locked, MST Locked, Unlocked, etc.)
(in case that nodeMode==master)
myProfile.masterProfile.howmanySlaves: number of slave base stations served currently
myProfile.masterProfile.howmanySats: number of satellites from which signals are received currently (in case that the number of satellites greater than 0)
myProfile.masterProfile.satProfiles[0-3]: SNR values of up to 4 satellites, recorded in descending order from highest value
(in case that nodeMode==slave)
myProfile.slaveProfile.masterIpAddress: IP address of the base station operating in master currently
(in Master Holdover Advertisement)
othersProfile [5]: information on up to 5 other base stations 2) SCAN-RSP message
version: DMS_MSGVERSION_1_0
msgType: DMS_MSGTYPE_SCANRSP
ackRequired: 0 or 1 (field indicating whether Ack is required)
sequenceId: same value as SCAN_REQ.sequenceId
groupId: group ID
originTimestamp: message transmission time
reqOriginTimestamp: originTimestamp value in SCAN-REQ message
reqReceitTimestamp: SCAN-REQ message receipt time
myProfile.nodeId.ipAddress: IP address of base station
myProfile.nodeId.identifier: MAC address of base station
myProfile.nodeMode: operation mode of base station (master or slave)
myProfile.nodeMMap: M-MAP information of base station
myProfile.clkState: clock state of base station (GPS Locked, MST Locked, Unlocked, etc.)
(in case that nodeMode==master)
myProfile.masterProfile.howmanySlaves: number of slave base stations that are served currently
myProfile.masterProfile.howmanySats: number of satellites from which signals are received currently (in case that number of satellites is greater than 0)
myProfile.masterProfile.satProfiles[0-3]: SNR values of up to 4 satellites, recorded in descending order from highest value
(in case that nodeMode==slave)
myProfile.slaveProfile.masterIpAddress: IP address of base station currently operating in master mode The master and slave nodes exchange SCAN-REQ and SCAN-RSP messages through UDP/IP. In case that the group ID of the SCAN-REQ/RSP message does not match with its own group ID, the message is ignored. In case that the sequence IDs of the SCAN-REQ message and the SCAN-RSP message received in response to the SCAN-REQ message do not match with each other, the received message is ignored and regards the situation as transmission failure.

In order to differentiate between the SCAN-REQ message requiring no response (Request only) and the SCAN-REQ message requiring response (Request-Response), the SCAN-REQ message requiring the response is retransmitted. The SCAN-RSP message requiring no replay (Response only) and the SCAN-RSP message requiring Ack are differentiated by referencing a field of the message header.

The retransmission timeout of the unicast SCAN-REQ message requiring reply is set to 4, and the number of retransmissions is set to 3. Accordingly, if no replay is received in four seconds after transmission of the SCAN-REQ message, the SCAN-REQ message is retransmitted up to 3 times.

In the SCAN-REQ/RSP message exchange process, if the clock state transitions from GPS locked state to holdover state, the Master Holdover Advertisement is transmitted. And if the master scan and master selection is performed in the holdover or unlock state, the messages are exchanged. In case that the clock state transitions to the GPS locked state, the SCAN-REQ message requiring no reply is transmitted for performing Master GPS Locked Advertisement due to the transition to the master mode.

The SCAN-REQ/RSP messages are exchanged as follows:

1) Master GPS Locked Advertisement: Message transmitted by the master. This message is transmitted in unicast transmitted to the members of a group when a base station enters the master mode. No reply is necessary and thus the ackRequired field is set to "no." This message is transmitted to all of the group members twice to guarantee reliability.

2) Master Holdover Advertisement: Message transmitted by the master. This message is transmitted to notify of the clock state transition to the holdover state. This message is transmitted to all of the group members in unicast with the request for replay to acknowledge the receipt of the message.

3) Master scan: Message transmitted by the slave base station to discover the master. This message is transmitted to all of the group members in unicast. Since the reply of the master base station is necessary, the ackRequired field is set to "yes."

Although the description has been directed to the base stations, the present invention can be applied to the various network nodes that are necessary to acquire clock synchronization as well as the base stations.

As described above, an exemplary clock synchronization method of the present invention allows the base station to switch between the master and slave modes dynamically according to the communication environment without limitation, thereby acquiring clock synchronization efficiently.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to exemplary embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving a clock synchronization signal, the method comprising:
   determining, by a first communication entity, whether the clock synchronization signal is received from a satellite;
   entering, by the first communication entity, a master mode when the clock synchronization signal is received; and
   entering a slave mode if the clock synchronization signal is not received,
   wherein, if the first communication entity enters the slave mode, the first communication entity searches a second communication entity which operates as the master mode, and
   wherein, if the first communication entity enters the master mode, the communication entity provides the clock synchronization signal with a third communication entity which operates as the slave mode.

2. The method of claim 1, wherein entering the slave mode comprises searching the second communication entity providing a clock synchronization signal.

3. The method of claim 2, further comprising selecting, if a plurality of communication entities providing a clock synchronization signal are searched, one of the plurality of the communication entities as the second communication entity.

4. The method of claim 3, wherein the second communication entity is selected based on at least one of M-MAP, number of satellites (#sats), number of slave base stations receiving service currently (#slaves), and signal strength (maxSnr) received from a satellite.

5. The method of claim 4, wherein the at least one of the M-MAP, the number of satellites (#sats), the number of slave base stations receiving service currently (#slaves), and the signal strength (maxSnr) is transmitted from each of the plurality of the communication entities.

6. The method of claim 3, wherein the selecting one of the plurality of the communication entities comprises selecting a communication entity having the smallest number of slave base stations among the plurality of the communication entities as the second communication entity.

7. The method of claim 3, wherein the second communication entity is selected based on scores that are weighted according to number of satellites (#sats), number of slave base stations receiving service currently (#slaves), and signal strength (maxSnr) received from a satellite.

8. The method of claim 1, wherein the determining comprises, if the clock synchronization signal is received, determining whether the received clock synchronization signal fulfills at least one predetermined condition.

9. A first communication entity comprising:
a transceiver configured to transmit and receive a signal; and
a controller configured:
to determine whether a clock synchronization signal is received from a satellite,
to enter a master mode if the clock synchronization signal is received, and
to enter a slave mode if the clock synchronization signal is not received,
wherein, if the first communication entity enters the slave mode, the first communication entity searches a second communication entity which operates as the master mode, and
wherein, if the first communication entity enters the master mode, the first communication entity provides the clock synchronization signal with a third communication entity which operates as the slave mode.

10. The first communication entity of claim 9, wherein the controller is further configured to search the second communication entity providing a clock synchronization signal.

11. The first communication entity of claim 10, wherein if a plurality of communication entities providing a clock synchronization signal are searched, the controller is further configured to select one of the plurality of the communication entities as the second communication entity.

12. The first communication entity of claim 11, wherein the second communication entity is selected based on at least one of M-MAP, number of satellites (#sats), number of slave base stations receiving service currently (#slaves), and signal strength (maxSnr) received from a satellite.

13. The first communication entity of claim 12, wherein the at least one of the M-MAP, the number of satellites (#sats), the number of slave base stations receiving service currently (#slaves), and the signal strength (maxSnr) is transmitted from each of the plurality of the communication entities.

14. The first communication entity of claim 11, wherein the controller is further configured to select a communication entity having the smallest number of slave base stations among the plurality of the communication entities as the second communication entity.

15. The communication entity of claim 11, wherein the second communication entity is selected based on scores that are weighted according to number of satellites (#sats), number of slave base stations receiving service currently (#slaves), and signal strength (maxSnr) received from a satellite.

16. The communication entity of claim 9, wherein the controller is further configured to determine whether the received clock synchronization signal fulfills at least one predetermined condition.

17. The method of claim 8, further comprising entering, if the received clock synchronization signal fulfills the at least one predetermined condition, the master mode.

18. The method of claim 8, further comprising entering, if the received clock synchronization signal unfulfills the at least one predetermined condition, the slave mode.

19. The first communication entity of claim 16, wherein the controller is further configured to enter the master mode if the received clock synchronization signal fulfills the at least one predetermined condition.

20. The first communication entity of claim 16, wherein the controller configured to enter the slave mode if the received clock synchronization signal unfulfills the at least one predetermined condition.

* * * * *